US010687361B2

(12) United States Patent
Bergljung et al.

(10) Patent No.: US 10,687,361 B2
(45) Date of Patent: Jun. 16, 2020

(54) FLEXIBLE TIME MASKS FOR LISTEN-BEFORE-TALK BASED CHANNEL ACCESS

(71) Applicant: TELEFONAKTIEBOLAGET LM ERICSSON (PUBL), Stockholm (SE)

(72) Inventors: Christian Bergljung, Lund (SE); Muhammad Kazmi, Sundbyberg (SE); Imadur Rahman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/337,908

(22) PCT Filed: Nov. 3, 2017

(86) PCT No.: PCT/IB2017/056883
§ 371 (c)(1),
(2) Date: Mar. 28, 2019

(87) PCT Pub. No.: WO2018/083652
PCT Pub. Date: May 11, 2018

(65) Prior Publication Data
US 2019/0230707 A1    Jul. 25, 2019

Related U.S. Application Data

(60) Provisional application No. 62/418,081, filed on Nov. 4, 2016.

(51) Int. Cl.
*H04W 74/08* (2009.01)
*H04L 5/00* (2006.01)
*H04W 72/04* (2009.01)

(52) U.S. Cl.
CPC ....... *H04W 74/0808* (2013.01); *H04L 5/0053* (2013.01); *H04L 5/0073* (2013.01); *H04W 72/042* (2013.01)

(58) Field of Classification Search
None
See application file for complete search history.

(56) References Cited

U.S. PATENT DOCUMENTS

| 2002/0042256 A1* | 4/2002 | Baldwin | H03D 3/008 455/232.1 |
| 2004/0029620 A1* | 2/2004 | Karaoguz | H04B 1/1615 455/574 |

(Continued)

FOREIGN PATENT DOCUMENTS

| WO | 2016092492 A1 | 6/2016 |
| WO | 2016141994 A1 | 9/2016 |
| WO | 20116148634 A2 | 9/2016 |

OTHER PUBLICATIONS

Author Unknown, ""3rd Generation Partnership Project; Technical Specification Group Radio Access Network; Evolved Universal Terrestrial Radio Access (E-UTRA); User Equipment (UE) radio transmission and reception (Release 14),"" 3GPP TS 36.101 V14.1.0, Sep. 2016, 3GPP Organizational Partners, 1187 pages.

(Continued)

*Primary Examiner* — Yaotang Wang
(74) *Attorney, Agent, or Firm* — Withrow & Terranova, PLLC

(57) ABSTRACT

Systems and methods for providing flexible time masks for transmission in a wireless communication system are disclosed. In some embodiments, a method of operation of a node in a wireless communication system comprises providing, to a wireless device, an indication of a position of a transient period during a time mask, where the position of the transient period is adapted to a clear channel assessment period at the wireless device or the position of the transient period is such that the transient period occurs at least partially during a clear channel assessment period. The time mask defines an OFF period during which a transmitter of (Continued)

the wireless device is to be off, an ON period during which the transmitter of the wireless device is to be on, and the transient period. The transient period is a period during which the transmitter of the wireless device is to ramp-up or ramp-down.

28 Claims, 15 Drawing Sheets

(56) References Cited

U.S. PATENT DOCUMENTS

| | | | | |
|---|---|---|---|---|
| 2010/0261429 | A1* | 10/2010 | Batra | H04L 27/18 455/41.2 |
| 2012/0155349 | A1* | 6/2012 | Bajic | H04W 4/80 370/311 |
| 2017/0373891 | A1 | 12/2017 | Berggren et al. | |
| 2019/0297572 | A1* | 9/2019 | Rahman | H04W 76/28 |

OTHER PUBLICATIONS

Author Unknown, "3rd Generation Partnership Project; Technical Specification Group Radio Access Network; Evolved Universal Terrestrial Radio Access (E-UTRA); Physical channels and modulation (Release 14))," 3GPP TS 36.211 V14.0.0, Sep. 2016, 3GPP Organizational Partners, 170 pages.

Author Unknown, "3rd Generation Partnership Project; Technical Specification Group Radio Access Network; Evolved Universal Terrestrial Radio Access (E-UTRA); Multiplexing and channel coding (Release 14))," 3GPP TS 36.212 V14.0.0, Sep. 2016, 3GPP Organizational Partners, 148 pages.

International Search Report and Written Opinion for International Patent Application No. PCT/IB2017/056883, dated Feb. 15, 2018, 14 pages.

Samsung, "CCA slot and tx-rx/rx-tx switching time," R1-1608982, 3GPP TSG RAN WG1 #86bis, Oct. 10-14, 2016, Lisbon, Portugal, 4 pages.

Extended European Search Report for European Patent Application No. 19197478.1, dated Jan. 8, 2020, 6 pages.

* cited by examiner

FLEXIBLE TIME MASKS FOR LISTEN-BEFORE-TALK BASED CHANNEL ACCESS

RELATED APPLICATIONS

This application is a national stage application of International Patent Application No. PCT/IB2017/056883, filed Nov. 3, 2017, which claims the benefit of U.S. provisional patent application Ser. No. 62/418,081, filed Nov. 4, 2016, the disclosures of which are hereby incorporated herein by reference in their entirety.

TECHNICAL FIELD

The disclosed subject matter relates generally to telecommunications. Certain embodiments relate more particularly to License Assisted Access (LAA), time masks, clear channel assessment, Listen-Before-Talk (LBT), or transient period.

BACKGROUND

Long Term Evolution (LTE) Release (Rel) 8

The transmission and reception for LTE is organized in radio frames consisting of subframes of 1 millisecond (ms) length in the time domain. The downlink (or uplink) radio frame with its subframes for Frequency Division Duplexing (FDD) is shown in FIG. 1, and the downlink and uplink radio frame for Time Division Duplexing (TDD) in FIG. 2. The radio frame structure is referred to as Frame Structure Type 1 (FS1) and Frame Structure Type 2 (FS2) for FDD and TDD, respectively. Each subframe contains two slots with seven Orthogonal Frequency Division Multiplexing (OFDM) symbols (71 microseconds ($\mu$s)) each in the normal configuration.

License Assisted Access (LAA) and Frame Structure Type 3 (FS3)

FS3 (specified in Third Generation Partnership Project (3GPP) Technical Specification (TS) 36.211) has been defined in the Rel-13 timeframe. In FS2 (a.k.a. TDD), a number of specific uplink and downlink subframe combinations are defined, while FS3 provides full flexibility in terms of uplink/downlink subframe combinations within a frame (or within a certain time period).

LAA of LTE was introduced in LTE Rel-13, and refers to the downlink Carrier Aggregation (CA) operation of at least one carrier in unlicensed spectrum with at least another carrier in any licensed spectrum. One such example is unlicensed carrier(s) Band 46 (the spectrum is also used for WiFi access), e.g., a User Equipment device (UE) can be configured with CA with a Primary Cell (PCell) in Band 1 (licensed spectrum) and a Secondary Cell (SCell) in Band 46 (unlicensed spectrum). In future, it is expected to have more unlicensed bands, thus LAA operations will be very prominent for future wireless systems. LAA operation is expected to be based on FS3. In later stages, unlicensed usage of LTE is expected to be extended to both downlink and uplink aggregation. Also, standalone LTE usage in unlicensed band will also be defined, that means single carrier LTE in unlicensed band or both PCell and SCell in unlicensed band will be designed. Future extensions also include aggregation of licensed and unlicensed carriers in inter-band dual connectivity manner.

An enhanced or evolved Node B (eNB) operating in the unlicensed band only transmits signals which may be used for UE measurements using so called Discovery Reference Symbols (DRSs). Unlike Rel-8 Common Reference Symbols (CRSs), DRS is not transmitted in every subframe, and is instead transmitted periodically (e.g., every 160 ms).

Listen-Before-Talk (LBT) Operation in LAA

The eNB may perform so called LBT procedures to check that no other node (such as another eNB or a WiFi access point or another terminal) is transmitting in the unlicensed spectrum before it transmits DRS (or any other downlink signals for that matter). This means that from a UE perspective, the eNB may be unable to transmit any particular DRS transmission. In certain regions, LBT functionality is required from a regulatory point of view to ensure fair coexistence of different radios and access technologies on the unlicensed band.

More specifically, the transmitter node determines whether the channel is free or occupied by measuring the energy on the medium over certain duration, i.e., LBT measurement duration. If the channel is found to be free, the transmitter occupies the channel and can transmit during a channel occupancy time, which can range for certain number of time resources, e.g. between 4 ms to 10 ms. If the channel is found to be occupied, on the other hand, the transmitter node refrains from transmitting and waits until the channel becomes free. In order to determine whether the channel is occupied or not during a particular LBT duration, a transmitter mode measures the energy detected during the LBT measurement duration and computes the corresponding power level. The power level is compared against a carrier sensing threshold, which may be referred to as a LBT threshold. If the power level is above the carrier sensing threshold, the channel is considered to be occupied. On the other hand, if the power level is below the threshold then the channel is considered to be free. The LBT may also interchangeably called a channel Carrier Sense Multiple Access (CSMA) scheme, channel assessment scheme, Clear Channel Assessment (CCA) scheme, etc. The CSMA or LBT based operation is more generally called contention based operation. The contention based operation is typically used for transmission on carriers of licensed band. But this mechanism may also be applied for operating on carriers belonging to licensed band, for example to reduce interference.

As mentioned earlier, in Rel-14, in addition to the downlink operation in the unlicensed spectrum, uplink operation is also being introduced. This means that a UE may be configured with uplink transmissions on one or more SCells in the unlicensed spectrum and perform uplink LBT if needed.

Standalone Access of Unlicensed Spectrum Using LTE

There will also be LTE systems operating in unlicensed spectrum completely in a standalone manner. The difference between LAA and "standalone LTE in unlicensed band" will be that there will not be any licensed carrier to be aggregated with unlicensed carrier in standalone usage, while an unlicensed LTE carrier is always aggregated with licensed carrier in LAA operations. Standalone operation means that uplink will also be allowed in unlicensed spectrum usage of LTE. Since there will not be any support from licensed carrier, the standalone LTE system is responsible for all functionalities in unlicensed spectrum.

In a standalone operation, a UE may be capable of only using a single carrier, or be capable of aggregating more than one unlicensed carriers at the same time. In that case, both PCell and SCell(s) will be in unlicensed spectrum.

LAA Operation in Dual Connectivity Mode

The unlicensed carrier can also be aggregated with a licensed carrier in dual connectivity manner. In dual connectivity mode, at least one Component Carrier (CC) in a Master eNB (MeNB) is termed a PCell and at least one CC in a Secondary eNB (SeNB) is termed a Primary Secondary Cell (PSCell). PCell and PSCell are functionally similar nodes. However, activation/deactivation/configuration/deconfiguration of a PSCell is controlled by the PCell. The connected nodes in Dual Connectivity (DC) operation are independent to each other; thus, all control signaling is done in a separate way.

License-Shared Operation of LTE

In a licensed shared spectrum, more than one Radio Access Technology (RAT) has the permission to access the spectrum, where all the RATs have equal status in terms of priority. The allowed systems access the spectrum based on a fairness criterion, e.g. LBT. This is also called horizontal sharing of the spectrum. In future, LTE may also be used in such spectrum scenarios.

ON/OFF Time Mask in LBT Based Operations

In the uplink, the UE (mobile station) may be scheduled to transmit one or more (possibly consecutive) 1 ms subframes. This means that the UE transmit chain with its power amplifier must ramp up at the start of the intended transmission during the subframe(s) and then immediately ramp down after this not to interfere with other UEs in the cell transmitting in other preceding or succeeding subframes. To that end, the transmitter of the UE should be "OFF" whenever it is not scheduled for transmission.

The transmission in the subframes are specified in terms of a time mask that defines the periods where the transmitter should be "ON" for the intended transmission, transient periods in which the transmitter can ramp up or down (typically 20 μs duration), and "OFF" period when the transmitter should be "OFF." During the "ON" period, the transmitter must meet specific transmit signal quality requirements to make sure the intended transmitted signal is not distorted. An example of a time mask is shown in FIG. 3, which is from 3GPP TS 36.101.

The transmitter can ramp up or down anytime during the transient period. For TDD, care must be taken such that ramping in one uplink subframe does not interfere with a following downlink (received) subframe in the same UE; proper timing requirements between TDD subframes normally handles this. There is also a time mask for control signals like the Sounding Reference Symbol (SRS) that is transmitted—possibly standalone—in the last symbol of a subframe as shown in FIG. 4. Then the transient periods are outside the single symbol (71 μs) not to distort the transmit signal quality during the short symbol.

For operations in unlicensed bands that require LBT functionality for fair sharing with other uncoordinated devices, the channel must be clear ("listen") for a certain period before the UE can transmit ("talk") on the radio channel. To this end, the UE must make a CCA for a certain period before transmission can commence. During the CCA the UE measures the energy attempts detecting known signature signals of other devices sharing the channel; if the energy is above a certain detection level then the channel is considered busy and the UE will defer transmission. Otherwise the channel is considered free and transmission can commence.

For LTE, the CCA is accommodated in a radio frame structure referred to as Frame Structure Type with subframes that can be either downlink or uplink but in a flexible manner (hence of TDD type). The CCA can be made during a period in the beginning of the subframe as shown by the shaded area in FIG. 5 or just preceding the subframe (the alternative CCA period in FIG. 5). In the former case the transmission in the subframe (e.g., Physical Uplink Shared Channel (PUSCH) transmission for LTE) is shortened to accommodate the CCA.

FIG. 5 shows an example of CCA preceding intended transmission. The CCA period may also include a back-off period in which the UE suspends transmissions for a random duration in time in order to prevent all UEs waiting for a clear channel from attempting transmission at the same time. There may also be other technologies sharing the same channel medium; these technologies may not use a subframe (radio frame) structure described herein but are also equipped with a LBT functionality with CCA contending for access to the channel.

The CCA periods can be of different duration (that is possibly mandated by technology-independent standards requirements in order to ensure fair coexistence between different technologies).

SUMMARY

Systems and methods for providing flexible time masks for transmission in a wireless communication system are disclosed. In some embodiments, a method of operation of a node in a wireless communication system comprises providing, to a wireless device, an indication of a position of a transient period during a time mask, where the position of the transient period is adapted to a Clear Channel Assessment (CCA) period at the wireless device or the position of the transient period is such that the transient period occurs at least partially during a CCA period at the wireless device. The time mask defines an OFF period during which a transmitter of the wireless device is to be off, an ON period during which the transmitter of the wireless device is to be on, and the transient period. The transient period is a period during which the transmitter of the wireless device is to ramp-up or ramp-down. In this manner, a position of the transient period can be flexibly controlled.

In some embodiments, the transient period is a period during which the transmitter of the wireless device is to ramp-up, and providing the indication comprises providing Downlink Control Information (DCI) comprising an indication of a parameter value, wherein the position of the transient period is such that the transient period starts an amount of time defined by the parameter value after a start of a subframe. In some embodiments, the method further comprises providing, to the wireless device, an indication of a position of a second transient period during the time mask, the second transient period being a period during which the transmitter of the wireless device is to ramp-down. In some embodiments, the DCI further comprises an indication of a second parameter value, and the position of the second transient period is such that the second transient period ends an amount of time defined by the second parameter value before an end of the subframe. Further, in some embodiments, the wireless communication system is a Third Generation Partnership Project (3GPP) Long Term Evolution (LTE) network, and the time mask is an ON/OFF time mask for Frame Structure Type 3 (FS3).

In some embodiments, the time mask is one of two or more time masks defined for different CCA period lengths.

In some embodiments, the time mask is a time mask for a signal transmitted in within a symbol period, the transient period is a period during which the transmitter of the wireless device is to ramp-down, and the transient period is inside the symbol period.

In some embodiments, the method further comprises adapting one or more parameters of a receiver of the node to receive signals transmitted by the wireless device using the time mask.

In some embodiments, a method of operation of a node in a wireless communication system comprises providing, to a wireless device, an indication of an allocation of transient periods within a time mask, where the time mask defines an OFF period during which a transmitter of the wireless device is to be off, an ON period during which the transmitter of the wireless device is to be on, a first transient period during which the transmitter of the wireless device is to ramp-up, and a second transient period during which the transmitter of the wireless device is to ramp-down. The position of the first transient period is adapted to a CCA period at the wireless device and/or the position of the second transient period is such that the second transient period occurs at least partially during a CCA period at the wireless device.

In some embodiments, a time mask type of the time mask depends on one or more parameters selected from a group consisting of: a type of a signal to be transmitted using the time mask and a traffic load in a respective cell of the cellular commutations network.

Embodiments of a node for a wireless communication system are also disclosed. In some embodiments, a node for a wireless communication system is adapted to provide, to a wireless device, an indication of a position of a transient period during a time mask, where the position of the transient period is adapted to a CCA period at the wireless device or the position of the transient period is such that the transient period occurs at least partially during a CCA period at the wireless device. The time mask defines an OFF period during which a transmitter of the wireless device is to be off, an ON period during which the transmitter of the wireless device is to be on, and the transient period wherein the transient period is a period during which the transmitter of the wireless device is to ramp-up or ramp-down.

In some embodiments, a node for a wireless communication system comprises a processor and memory comprising instructions executable by the processor whereby the node is operable to provide, to a wireless device via an associated radio unit, an indication of a position of a transient period during a time mask, wherein the position of the transient period is adapted to a CCA period at the wireless device or the position of the transient period is such that the transient period occurs at least partially during a CCA period at the wireless device. The time mask defines an OFF period during which a transmitter of the wireless device is to be off, an ON period during which the transmitter of the wireless device is to be on, and the transient period wherein the transient period is a period during which the transmitter of the wireless device is to ramp-up or ramp-down.

In some embodiments, a node for a wireless communication system comprises one or more modules operable to provide, to a wireless device, an indication of a position of a transient period during a time mask, wherein the position of the transient period is adapted to a CCA period at the wireless device or the position of the transient period is such that the transient period occurs at least partially during a CCA period at the wireless device. The time mask defines an OFF period during which a transmitter of the wireless device is to be off, an ON period during which the transmitter of the wireless device is to be on, and the transient period wherein the transient period is a period during which the transmitter of the wireless device is to ramp-up or ramp-down.

In some embodiments, a node for a wireless communication system is adapted to provide, to a wireless device, an indication of an allocation of transient periods within a time mask, where the time mask defines an OFF period during which a transmitter of the wireless device is to be off, an ON period during which the transmitter of the wireless device is to be on, a first transient period during which the transmitter of the wireless device is to ramp-up, and a second transient period during which the transmitter of the wireless device is to ramp-down. The position of the first transient period is adapted to a CCA period at the wireless device and/or the position of the second transient period is such that the second transient period occurs at least partially during a CCA period at the wireless device.

In some embodiments, a node for a wireless communication system comprises a processor and memory comprising instructions executable by the processor whereby the node is operable to provide, to a wireless device via an associated radio unit, an indication of an allocation of transient periods within a time mask. The time mask defines an OFF period during which a transmitter of the wireless device is to be off, an ON period during which the transmitter of the wireless device is to be on, a first transient period during which the transmitter of the wireless device is to ramp-up, and a second transient period during which the transmitter of the wireless device is to ramp-down. The position of the first transient period is adapted to a CCA period at the wireless device and/or the position of the second transient period is such that the second transient period occurs at least partially during a clear CCA at the wireless device.

In some embodiments, a node for a wireless communication system comprises one or more modules operable to provide, to a wireless device, an indication of an allocation of transient periods within a time mask, the time mask defining an OFF period during which a transmitter of the wireless device is to be off, an ON period during which the transmitter of the wireless device is to be on, a first transient period during which the transmitter of the wireless device is to ramp-up, and a second transient period during which the transmitter of the wireless device is to ramp-down. The position of the first transient period is adapted to a CCA period at the wireless device and/or the position of the second transient period is such that the second transient period occurs at least partially during a CCA period at the wireless device.

Embodiments of a method of operation of a wireless device in a wireless communication system are also disclosed. In some embodiments, a method of operation of a wireless device in a wireless communication system comprises determining a position of a transient period during a time mask, where the position of the transient period is adapted to a CCA period at the wireless device or the position of the transient period is such that the transient period occurs at least partially during a CCA period at the wireless device. The time mask defines an OFF period during which a transmitter of the wireless device is to be off, an ON period during which the transmitter of the wireless device is to be on, and the transient period wherein the transient period is a period during which the transmitter of the wireless device is to ramp-up or ramp-down. The method further comprises transmitting a signal in accordance with the time mask and the indication of the position of the transient period during the time mask.

In some embodiments, determining the position of the transient period comprises determining the position of the transient period based on an indication received from a network node and/or predefined information.

In some embodiments, the transient period is a period during which the transmitter of the wireless device is to ramp-up, and receiving the indication comprises receiving downlink control information comprising an indication of a parameter value, wherein the position of the transient period is such that the transient period starts an amount of time defined by the parameter value after a start of a subframe. In some embodiments, the method further comprises receiving, from the node of the wireless communication system, an indication of a position of a second transient period during the time mask, the second transient period being a period during which the transmitter of the wireless device is to ramp-down. In some embodiments, the DCI further comprises an indication of a second parameter value, and the position of the second transient period is such that the second transient period ends an amount of time defined by the second parameter value before an end of the subframe. Further, in some embodiments, the wireless communication system is a 3GPP LTE network, and the time mask is an ON/OFF time mask for FS3.

In some embodiments, the time mask is one of two or more time masks defined for different CCA period lengths.

In some embodiments, the time mask is a time mask for a signal transmitted in within a symbol period, the transient period is a period during which the transmitter of the wireless device is to ramp-down, and the transient period is inside the symbol period.

Embodiments of a wireless device for a wireless communication system are also disclosed. In some embodiments, a wireless device for a wireless communication system is adapted to determine a position of a transient period during a time mask, wherein the position of the transient period is adapted to a CCA period at the wireless device or the position of the transient period is such that the transient period occurs at least partially during a CCA period at the wireless device. The time mask defines an OFF period during which a transmitter of the wireless device is to be off, an ON period during which the transmitter of the wireless device is to be on, and the transient period, wherein the transient period is a period during which the transmitter of the wireless device is to ramp-up or ramp-down. The wireless device is further adapted to transmit a signal in accordance with the time mask and the indication of the position of the transient period during the time mask.

In some embodiments, a wireless device for a wireless communication system comprises a transceiver, a processor, and memory comprising instructions executable by the processor whereby the wireless device is operable to determine a position of a transient period during a time mask, wherein the position of the transient period is adapted to a CCA period at the wireless device or the position of the transient period is such that the transient period occurs at least partially during a CCA period at the wireless device. The time mask defines an OFF period during which a transmitter of the wireless device is to be off, an ON period during which the transmitter of the wireless device is to be on, and the transient period, wherein the transient period is a period during which the transmitter of the wireless device is to ramp-up or ramp-down. The wireless device is further operable to transmit, via the transceiver, a signal in accordance with the time mask and the indication of the position of the transient period during the time mask.

In some embodiments, a wireless device for a wireless communication system comprises one or more modules operable to determine a position of a transient period during a time mask, wherein the position of the transient period is adapted to a CCA period at the wireless device or the position of the transient period is such that the transient period occurs at least partially during a CCA period at the wireless device. The time mask defines an OFF period during which a transmitter of the wireless device is to be off, an ON period during which the transmitter of the wireless device is to be on, and the transient period, wherein the transient period is a period during which the transmitter of the wireless device is to ramp-up or ramp-down. The one or more modules are further operable to transmit a signal in accordance with the time mask and the indication of the position of the transient period during the time mask.

BRIEF DESCRIPTION OF THE DRAWINGS

The accompanying drawing figures incorporated in and forming a part of this specification illustrate several aspects of the disclosure, and together with the description serve to explain the principles of the disclosure.

The drawings illustrate selected embodiments of the disclosed subject matter. In the drawings, like reference labels denote like features.

DETAILED DESCRIPTION

Figure 1:
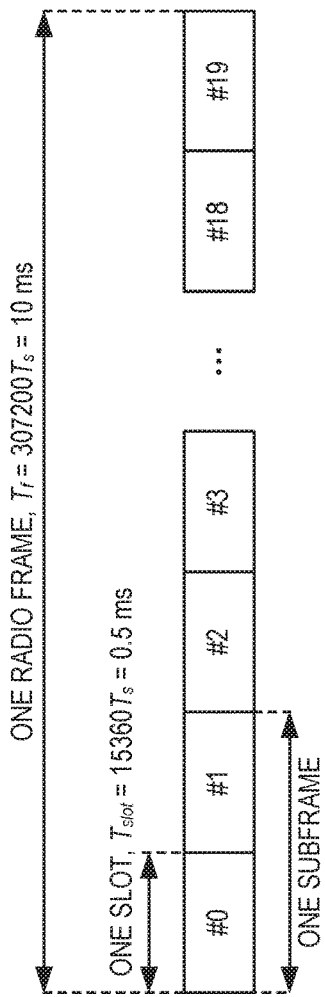
FIG. 1 shows a radio frame for Frequency Division Duplexing (FDD), which is also referred to as Frame Structure Type 1 (FS1)
Figure 2:
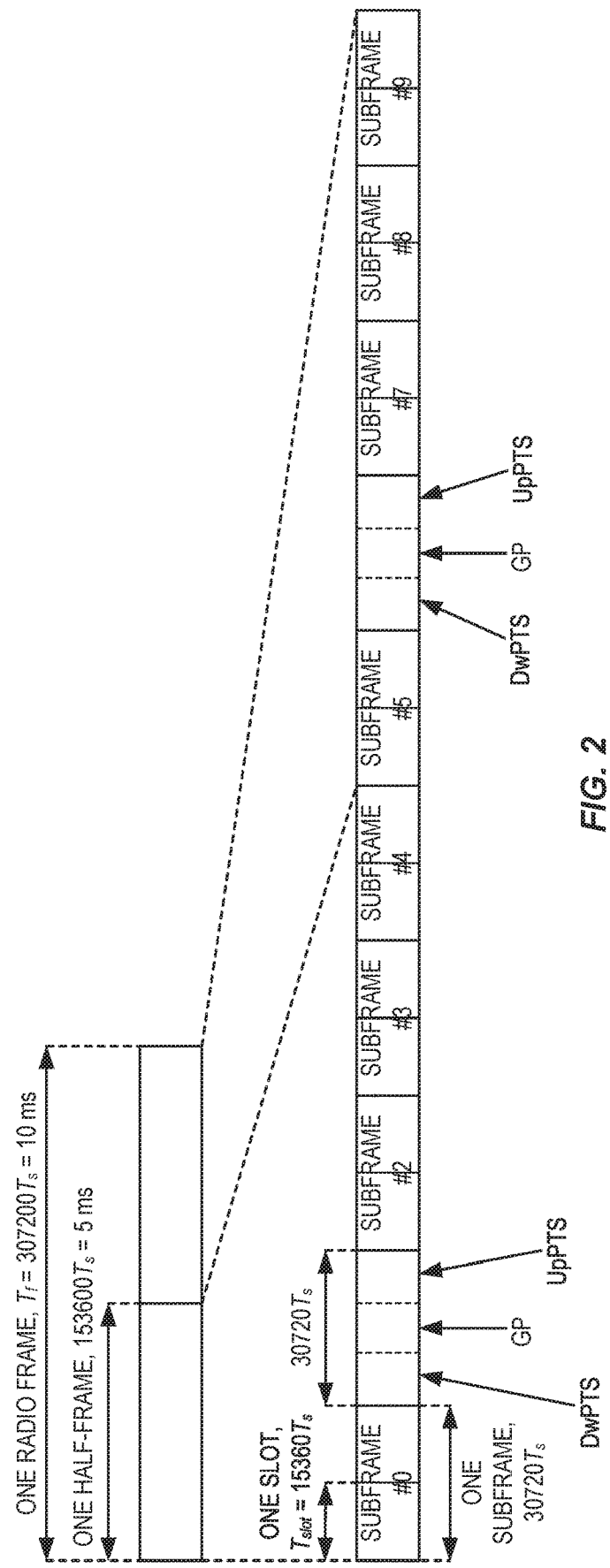
FIG. 2 shows a radio frame for Time Division Duplexing (TDD), which is also referred to as Frame Structure Type 2 (FS2)
Figure 3:
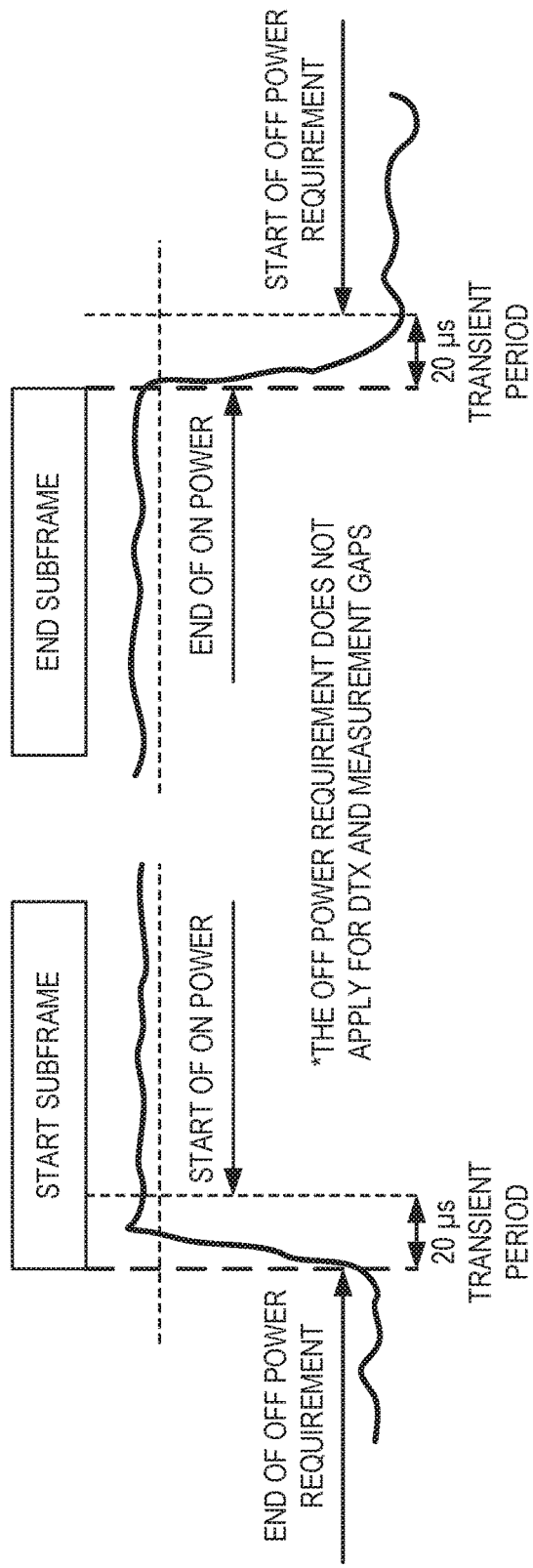
FIG. 3 shows an example of a time mask for Long Term Evolution (LTE) with its ON/OFF and transient periods.
Figure 4:
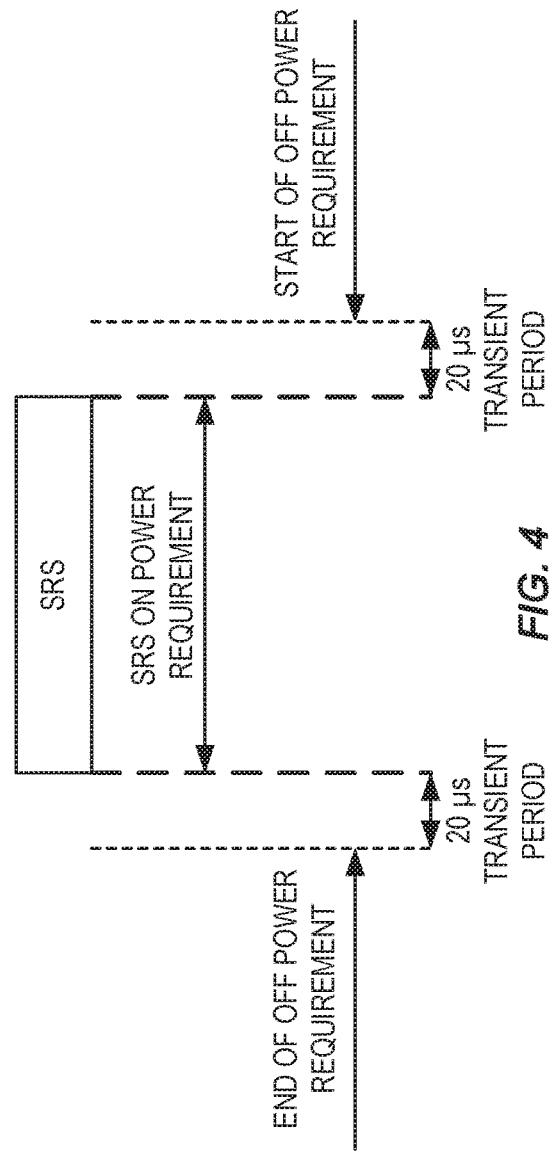
FIG. 4 shows an example time mask for Sounding Reference Symbol (SRS)
Figure 5:
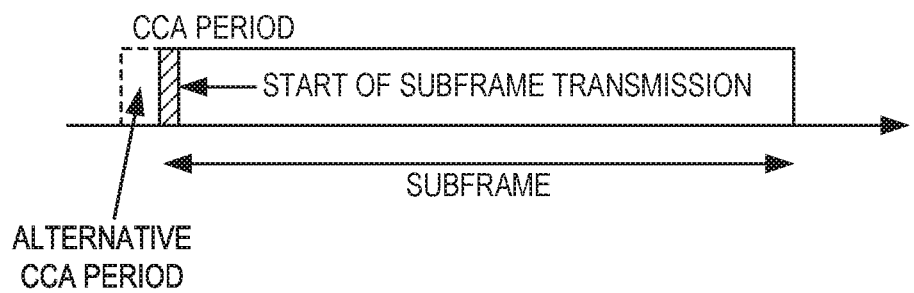
FIG. 5 shows an example of Clear Channel Assessment (CCA) preceding an intended transmission.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

In the description that follows, certain examples are presented in the context of Long Term Evolution (LTE) and/or License Assisted Access (LAA), but the described concepts are not limited to LTE and/or LAA. For instance, the described embodiments may be adapted for other Radio Access Technologies (RATs), e.g., Universal Terrestrial Radio Access (UTRA), LTE-Advanced, Fifth Generation (5G), Next Generation (NX), Narrowband Internet of Things (NB-IoT), WiFi, Bluetooth, etc., or even for peer-to-peer, Device-to-Device (D2D), or Vehicle-to-X (V2X) communication, whenever a Listen-Before-Talk (LBT) procedure or alike is used.

The terms "uplink channel," "uplink signal," "radio transmission," and "uplink transmission" are used herein interchangeably. Also, even though the examples and embodiments herein are described for a specific uplink channel (Physical Random Access Channel (PRACH)), the embodiments can also be applicable for other channels or signal transmissions (uplink channels or uplink signal transmission, or channels or signal transmissions for peer-to-peer, D2D, or V2X communication).

In some embodiments a non-limiting term "User Equipment device (UE)" is used. The UE herein can be any type of wireless device capable of communicating with network node or another UE over radio signals. The UE may also be a radio communication device, a target device, a D2D UE, a machine type UE, or a UE capable of Machine-to-Machine (M2M), a sensor equipped with a UE, an iPad, a tablet, mobile terminals, a smart phone, Laptop Embedded Equipment (LEE), Laptop Mounted Equipment (LME), Universal Serial Bus (USB) dongles, Customer Premises Equipment (CPE), etc.

Also in some embodiments generic terminology "network node" is used. It can be any kind of network node which may comprise a radio network node such as a base station, a radio base station, a base transceiver station, a base station controller, a network controller, an enhanced or evolved Node B (eNB), a Node B, a Multi-cell/Multicast Coordination Entity (MCE), a relay node, an access point, a radio access point, a Remote Radio Unit (RRU), a Remote Radio Head (RRH), a core network node (e.g., a Mobility Management Entity (MME), a Self-Organizing Network (SON) node, a coordinating node, a positioning node, a Minimization of Drive Tests (MDT) node, etc.), or even an external node (e.g., a third party node, a node external to the current network), etc.

In some embodiments the generic terminology Primary Cell (PCell), Primary Secondary Cell (PSCell), and Secondary (Serving) Cell (SCell) is used. These terms may refer to different types of serving cells which a certain UE is configured to use. Other terms which may be used for these terms are Primary Component Carrier (PCC), Primary Secondary Component Carrier (PSCC), and Secondary Component Carrier (SCC), respectively.

The term "radio node" used herein may be used to denote a UE or a radio network node.

The embodiments are applicable to single carrier as well as to multicarrier or Carrier Aggregation (CA) operation of the UE in which the UE is able to receive and/or transmit data to more than one serving cells. The term CA is also called (e.g., interchangeably called) "multi-carrier system," "multi-cell operation," "multi-carrier operation," and "multi-carrier" transmission and/or reception. In CA one of the Component Carriers (CCs) is the PCC or simply primary carrier or even anchor carrier. The remaining ones are called SCCs or simply secondary carriers or even supplementary carriers. The serving cell is interchangeably called a PCell or Primary Serving Cell (PSC). Similarly, the secondary serving cell is interchangeably called a SCell or Secondary Serving Cell (SSC).

In Dual Connectivity (DC) operation the UE can be served by at least two nodes called the Master eNB (MeNB) and the Secondary eNB (SeNB). More generally in multiple connectivity (aka multi-connectivity) operation the UE can be served by two or more nodes, e.g. MeNB, SeNB1, and SeNB2 and so on. The UE is configured with the PCC from both the MeNB and SeNB. The PCell from the MeNB and SeNB are called a PCell and PSCell, respectively. The PCell and PSCell operate the UE typically independently. The UE is also configured with one or more SCCs from each of the MeNB and SeNB. The corresponding SSCs served by the MeNB and SeNB are called SCells. The UE in DC typically has separate transmitters/receivers for each of the connections with the MeNB and SeNB. This allows the MeNB and SeNB to independently configure the UE with one or more procedures, e.g. Radio Link Monitoring (RLM), Discontinuous Reception (DRX) cycle, etc. on their PCell and PSCell, respectively. The methods and embodiments are applicable to CA, DC, and Multi-Connectivity (MC).

The term "signaling" used herein may comprise any of: high-layer signaling (e.g., via Radio Resource Control (RRC)), lower-layer signaling (e.g., via a physical control channel or a broadcast channel), or a combination thereof. The signaling may be implicit or explicit. The signaling may further be unicast, multicast, or broadcast. The signaling may also be directly to another node or via a third node.

The term Discovery Reference Symbol (DRS) or discover (or discovery) signal may comprise of any type of reference signal, which can be used by the UE for performing one or more measurements. Examples of DRS are Common Reference Symbol (CRS), Channel State Information Reference Signal (CSI-RS), Primary Synchronization Signal (PSS), Secondary Synchronization Signal (SSS), Multicast-Broadcast Single Frequency Network (MBSFN) reference signal, etc. One or more DRS may be transmitted in the same DRS time resource. Examples of a DRS time resource are symbol, subframe, slot, etc.

The term "measurement" herein refers to radio measurements. Some examples of the radio measurements are: Received Signal Strength Indicator (RSSI) measurement, channel occupancy measurement, WiFi RSSI measurement, signal strength or signal power measurements (e.g., Reference Signal Received Power (RSRP) or Channel State Information RSRP (CSI-RSRP)), signal quality measurements (e.g., Reference Signal Received Quality (RSRQ), Signal to Interference plus Noise Ratio (SINR)), timing measurements (e.g., reception-transmission, Reference Signal Time Difference (RSTD), Round Trip Time (RTT), Time of Arrival (TOA)), RLM measurements, CSI, Precoding Matrix Indicator (PMI), cell detection, cell identification, number of successful reports, number of Acknowledgements (ACKs)/Negative Acknowledgments (NACKs), failure rate, error rate, etc. The measurements may be absolute or relative (e.g., absolute RSRP and relative RSRP). The measurements may be performed for one or more different purpose, e.g., Radio Resource Management (RRM), SON, positioning, MDT, etc. The measurements may be, e.g., intra-frequency measurements, inter-frequency measurements, or CA measurements. The measurements may be performed in the licensed and/or unlicensed spectrum. The measurements or measurement reporting may be single measurements, periodic or aperiodic, event-triggered, logged measurements, etc.

The term LBT used herein may correspond to any type of Carrier Sense Multiple Access (CSMA) procedure or mechanism which is performed by the node on a carrier before deciding to transmit signals on that carrier. CSMA or LBT may also interchangeably called Clear Channel Assessment (CCA), clear channel determination, etc. The transmission of signals on a carrier subjected to LBT is also called contention based transmission. On the other hand, the transmission of signals on a carrier which is not subjected to LBT is also called contention free transmission.

Hereafter, the terms "LAA," "enhanced LAA (eLAA)," "unlicensed operation," "operation in unlicensed band," "standalone LTE," "unlicensed operation," "license shared operation," "Licensed Shared Access (LSA) operation," "operation under Frame Structure Type 3 (FS3)," and "operation with LBT" may be used interchangeably, unless otherwise indicated.

In certain embodiments of the disclosed subject matter, the transient periods accommodating transmitter ramping can be allocated in a flexible way within the time masks to reduce the risk that power ramping is interfering with the CCA period of other devices or that the actual power ramping is delayed allowing other devices to gain access of the channel. The allocation of the transient periods within the time mask (the type of time mask used) and the CCA period can be indicated to the UE by the base station or any coordination point. The type of mask thus indicated can depend on, e.g., type of transmitted signal such as Physical Uplink Shared Channel (PUSCH) and Sounding Reference Symbol (SRS) for LTE and the traffic load in the cell (number of devices contending for the channel).

The duration of the CCA period can be indicated to the UE by the base station or coordination point and the start of the channel sensing can be flexible.

Certain embodiments are presented in recognition of shortcomings associated with conventional approaches, such as the following.

Figure 6:
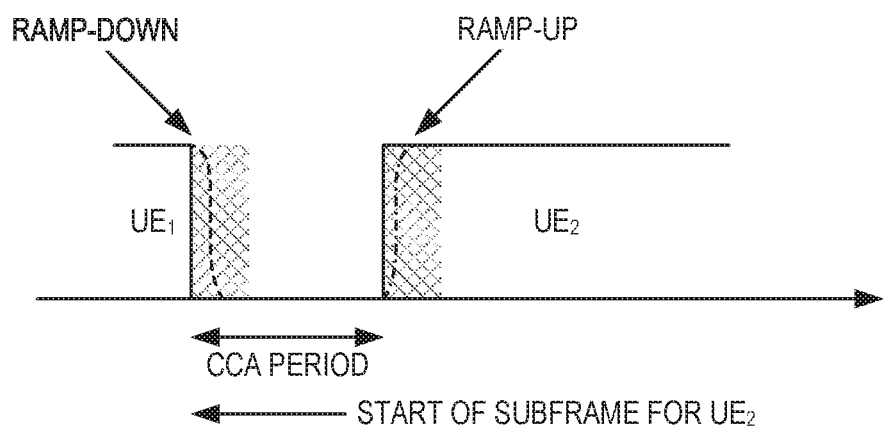
FIG. 6 illustrates certain problems with ramping during the CCA period.

In conventional approaches, if the power ramping during a transient period of one UE (labelled $UE_1$) can take place during a significant part of the CCA period of a following transmission of another UE (labelled $UE_2$), access to the channel may be prevented if the latter UE detects the signal of the former UE ramping down as indicated in FIG. 6. The transient period of the $UE_1$ occurs during the CCA period of $UE_2$ that may interpret the ramping signal as a busy channel and defer transmission.

Another potential problem may occur after the CCA period if the ramping of $UE_2$ is delayed but still takes place during the allowed transient period. In this case another device (UE) contending for the channel may consider the channel free and start transmission even if $UE_2$ has completed the CCA period without detecting any other device and thus also considered the channel free. The problem is exacerbated if all UEs in the cell (and possibly in interfering cells) have the same basic timing and start contention for the channel at the same time.

Yet another potential problem is that the existing time masks for LTE do not accommodate different CCA periods.

Certain embodiments may provide various potential benefits compared with conventional approaches. For instance, a flexible allocation of a transient period within a time mask can avoid situations where (a) ramp-down of power of one device is preventing subsequent transmission of other devices gaining access to the channel by LBT (blocking of other devices), and/or (b) ramp-up of power is delayed and other devices contending for the channel gain access to the channel by LBT (collision avoidance). Additionally, the time masks can accommodate different durations of CCA periods needed for the LBT functionality. The duration of the said period can be indicated by the base station.

The described embodiments may be implemented in any appropriate type of communication system supporting any suitable communication standards and using any suitable components. As one example, certain embodiments may be implemented in a communication system 700 such as that illustrated in FIG. 7. Although certain embodiments are described with respect to LTE systems and related terminology, the disclosed concepts are not limited to LTE or a Third Generation Partnership Project (3GPP) system. Additionally, although reference may be made to the term "cell," the described concepts may also apply in other contexts, such as beams used in 5G systems, for instance.

Figure 7:
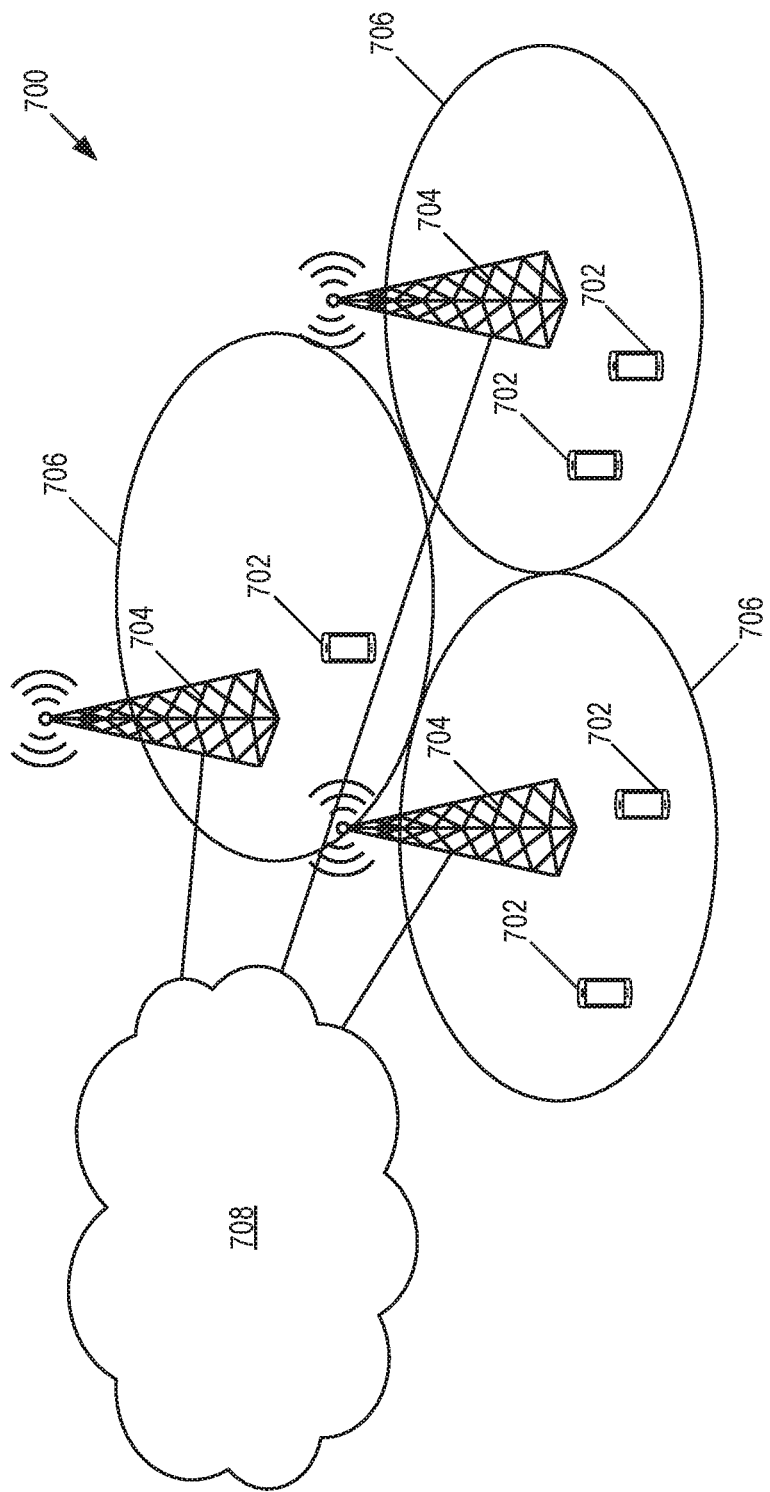
FIG. 7 illustrates one example of a wireless communication system in which embodiments of the present disclosure may be implemented.

Referring to FIG. 7, the communication system 700 comprises a plurality of wireless communication devices 702 (e.g., UEs, Machine Type Communication (MTC)/M2M UEs) and a plurality of radio access nodes 704 (e.g., eNBs or other base stations). The communication system 700 is organized into cells 706, which are connected to a core network 708 via the corresponding radio access nodes 704. The radio access nodes 704 are capable of communicating with the wireless communication devices 702 along with any additional elements suitable to support communication between wireless communication devices or between a wireless communication device and another communication device (such as a landline telephone).

Description of a Scenario Involving SRS Carrier Based Switching

The basic scenario comprises of a UE (e.g., the wireless communication device 702) being served by a first network node (e.g., a first radio access node 704) with a PCell operating on a first carrier frequency (f1) and the UE may also capable of being served by at least one SCell also known as a first SCell. The UE may further be capable of being served by two or more SCells, the first SCell and a second SCell, as follows. The first SCell operates on a second carrier frequency (f2) and the second SCell operates on a third carrier frequency (f3). The same applies for more than two SCells. As an example, the carrier frequencies (f1 and f3) belong to a licensed spectrum or band, whereas the carrier frequency (f2) belongs to an unlicensed spectrum or frequency band. Other combinations are also possible.

In an unlicensed spectrum or band contention based transmission is allowed, i.e. two or more devices (UE or network nodes) can access even the same part of the spectrum based on certain fairness constraints, e.g. LBT. In this case no operator (or user or transmitter) owns the spectrum. In a licensed spectrum or licensed band only contention free transmission is allowed, i.e. only devices (UE or network nodes) allowed by the owner of the spectrum license can access the licensed spectrum.

In some embodiments the UE may also be capable of being served by more than two SCells, e.g. a third SCell operating on carrier frequency (f4) and so on. Carrier frequency (f4) can be either in a licensed spectrum (or band) or in licensed spectrum (or band). The carrier frequency (f1) is interchangeably called a PCC while carrier frequencies (f2, f3, and f4) may interchangeably be called SCC1, SCC2, and SCC3 respectively.

Methods in a UE

In a first embodiment, the position of the transient period is allocated in a flexible way in different types of time masks; the position and/or the type of mask to be used can be indicated by the network node or access/coordination point (or any other node in the network). The indication can depend on, e.g., network configuration and traffic load. In another example, the position and/or the type of mask to be used can be predefined.

Figure 8:
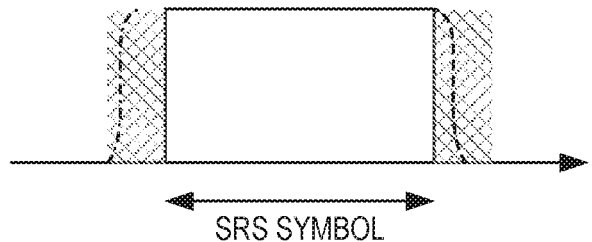
FIG. 8 shows an example of an SRS time mask.

One such example (but not limited to) is the uplink reference signal time mask (e.g., SRS time mask) as shown in FIG. 8 in which the transient periods accommodating power ramping are indicated by the shaded areas. In this case the ramping is taken outside the reference signal (e.g., SRS symbol) thus improving the transmit signal quality within the symbol but at the risk of the ramping causing collision with other devices (leading edge) or blocking with other devices (trailing edge). This risk may be low if the traffic load is low.

Figure 9:
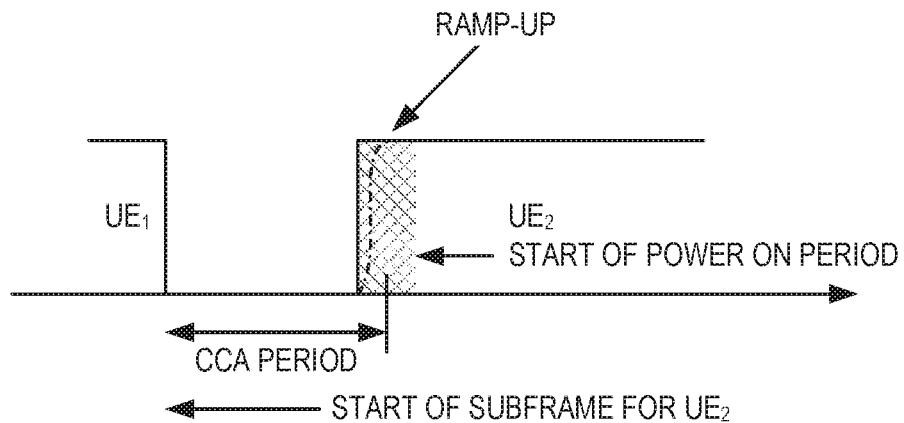
FIG. 9 shows an example of a flexible allocation of the transient period wherein the transient period can occur partially during the CCA period.

In a second embodiment the transient period can occur partially during the CCA period as shown in FIG. 9 thus reducing the risk that other devices gain access to the channel due to delayed ramping. The arrangement can be indicated/enabled by the network node (that is possibly also indicating this arrangement as a type of mask as described in herein). Examples of CCA period are 5 microseconds (μs), 25 μs, 30 μs, etc.

When the transient period has expired, the power ON requirements are applied during which certain transmit signal quality requirements should be met. Examples of metrics defining transmit signal quality are Error Vector Magnitude (EVM) (e.g., 8% percent), in-band emission, carrier leakage, etc.

In this example the transient period of the leading edge is allocated in a flexible way; the same procedure may be applied to the trailing edge.

In a third embodiment, different types of time masks are designed in a way to accommodate CCA periods of different lengths preceding the transient periods at the leading edge of a subframe. The length of the CCA periods (type of masks) can be indicated by the network node. The duration of the CCA period may be prescribed by, e.g., regulation, predefined, or configured by the network node.

In the above embodiments the allocation of the transient period is described for the UE and the position of the period or the type of mask is indicated by the base station.

Methods in a Network Node

The network node may inform (or transmit to) the UE regarding any of the following information:
the position and the type of mask to be used by the UE;
whether the transition period can occur with the CCA period or not;
the length of CCA periods (type of masks);
etc.

Figure 10:
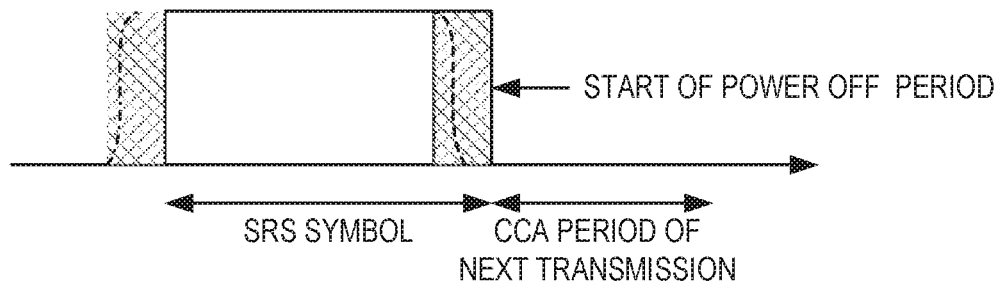
FIG. 10 shows an alternative example time mask indicated by the base station.

As an alternative, the network node can indicate a different type of mask in which the transient period is located within the mask; the case in which the transient period at the trailing edge is taken inside the symbol is shown in FIG. 10. Then the risk of collision is reduced but this is at the expense of a deteriorated transmit signal quality for the transmitted reference signal (e.g., SRS symbol) is affected by power ramping. This compromise may still be acceptable at, e.g., higher traffic load with many UEs contending for access to the channel.

In another embodiment, the transient period is allocated in a flexible way for the base station that must also contend for access to the channel.

In certain embodiments the network node (e.g., serving base station) adapts one or more parameters of its receiver to receive signals transmitted by the UE using the allocated or adaptive time mask. For example, if the transient periods fall inside the symbol the network node may apply a more robust receiver which can mitigate the interference caused by the transient periods when receiving the useful part of the symbol.

System Operation

Figure 11:
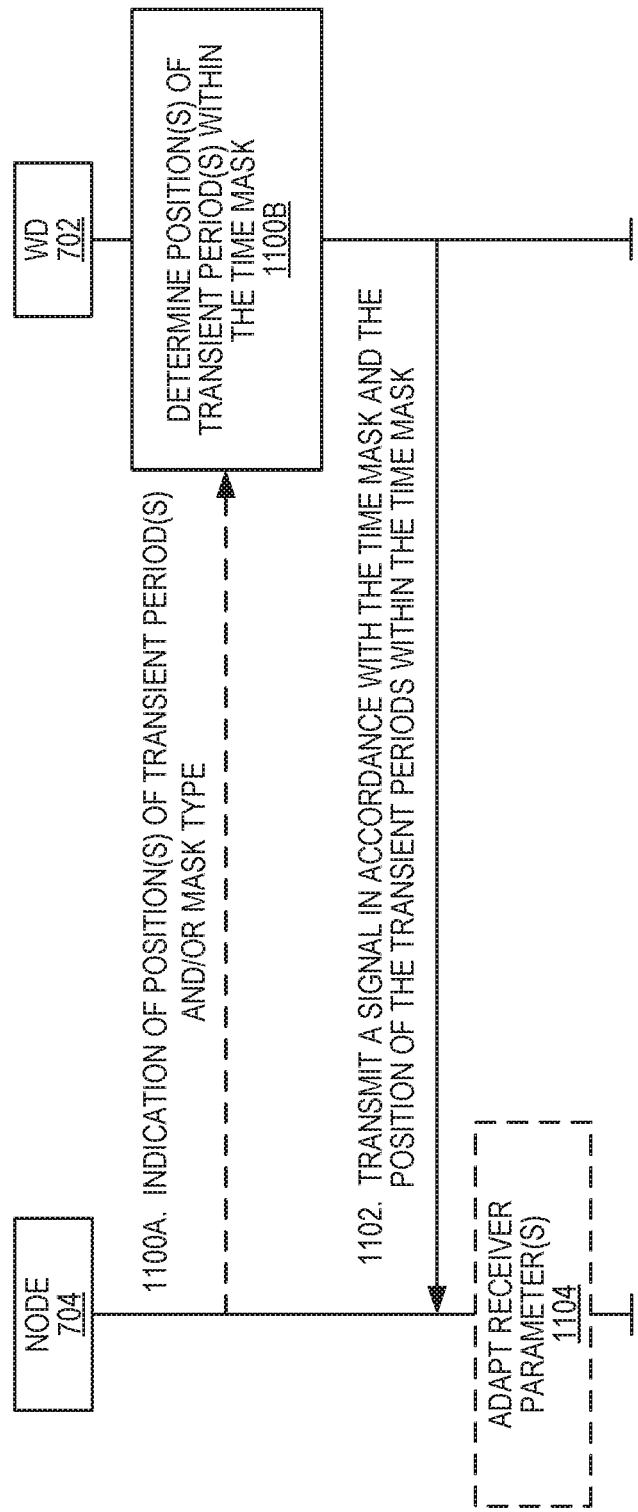
FIG. 11 illustrates the operation of a network node and a wireless device in accordance with some embodiments of the present disclosure.

FIG. 11 illustrates the operation of a radio access node 704 and a wireless communication device 702 in accordance with at least some embodiments described herein. As illustrated, in some embodiments, the radio access node 704 provides, to the wireless communication device 702, an indication of a position(s) of a transient period(s) within a time mask and/or a mask type of the time mask (step 1100A), as described above. Note that step 1100A is optional, as indicated by the dashed line. The wireless communication device 702 determines a position(s) of the transient period(s) within a time mask (step 1100B). In some embodiments, this determination is based on the indication received from the radio access node 704 in step 1100A and/or predefined information, as described above. The wireless communication device 702 then transmits a signal in accordance with the time mask and the positions of the transient periods within the time mask (step 1102). In other words, when it is time to transmit, the wireless communication device 702 ramps-up its transmitter during the ON transient period (i.e., the transient period for transitioning from OFF to ON), transmits the signal during the ON period, and then ramps-down its transmitter during the OFF transient period (i.e., the transient period for transitioning from ON to OFF). By providing the indication in step 1100, the network is able to flexibly control the mask type (which has associated transient period positions) and/or the position of one or both of the transient periods of the time mask.

Optionally, the radio access node 704 adapts one or more parameters of its receiver based on the type of time mask and/or the positions of the transient periods in the time mask (step 1104), as described above.

Example Embodiments

General ON/OFF Time Mask:

As specified in 3GPP TS 36.101 v14.1.0, the general ON/OFF time mask defines the observation period between transmit OFF and ON power and between transmit ON and OFF power. ON/OFF scenarios include: the beginning or end of Discontinuous Transmission (DTX), measurement gap, contiguous, and non contiguous transmission.

The OFF power measurement period is defined in a duration of at least one subframe excluding any transient periods. The ON power is defined as the mean power over one subframe excluding any transient period.

There are no additional requirements on UE transmit power beyond that which is required in subclause 6.2.2 and subclause 6.6.2.3 of 3GPP TS 36.101 v14.1.0.

Figure 12:
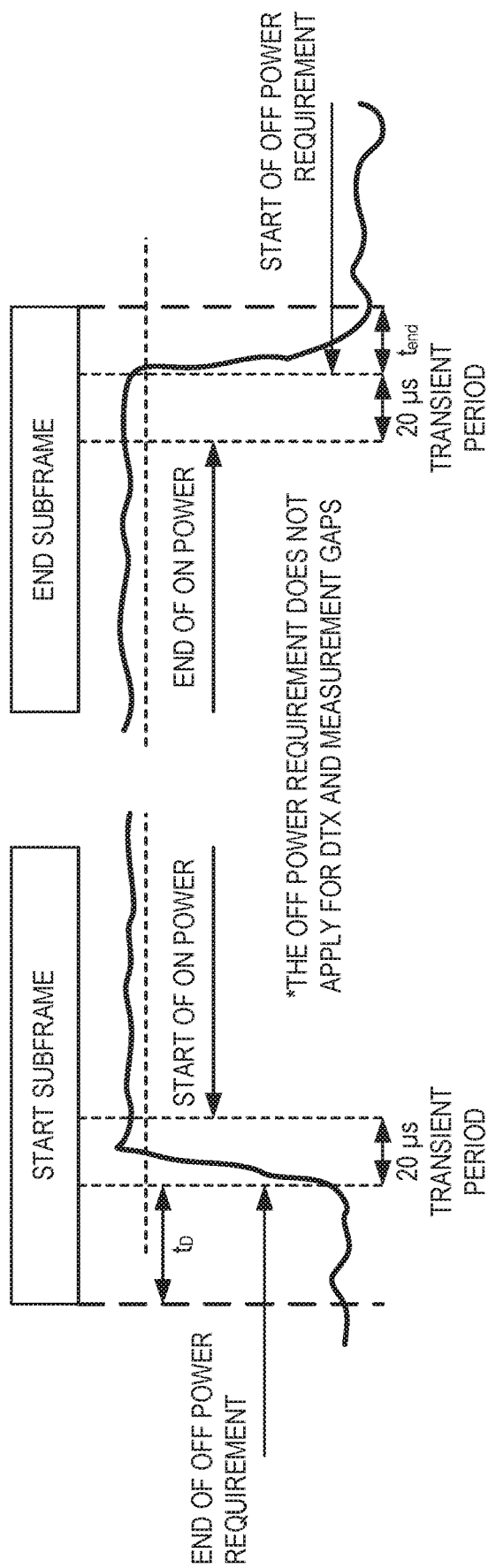
FIG. 12 illustrates an ON/OFF time mask for Frame Structure Type 3 (FS3)

FIG. 12 illustrates the general ON/OFF time mask for FS3. As illustrated, for FS3, the general ON/OFF mask is specified in 3GPP TS 36.101 v14.1.0, Section 6.3.4.1-1A with the PUSCH starting position modified by $t_D=N_{start}^{FS3}T_S$ relative to the start of the subframe as indicated in the associated Downlink Control Information (DCI), where $N_{start}^{FS3}$ and the basic time unit $T_S$ are specified in 3GPP TS 36.211 V14.0.0. At the end of the subframe $t_{end}=0$ and $t_{end}=T_{symb}$ with $T_{symb}$ denoting the duration of the last Single Carrier Frequency Division Multiple Access (SC-FDMA) symbol when the bit indicating the PUSCH ending symbol in the associated DCI has value '0' and '1' as specified in 3GPP TS 36.212 V14.0.0, respectively.

Thus, in the example of FIG. 12, the position of the ON transient period is flexibly controlled through the parameter $t_D$. The position of the OFF transient period is flexibly controlled through the parameter $t_{end}$, the value of which is controlled by the bit indicating the PUSCH ending symbol in the associated DCI.

Figure 13:
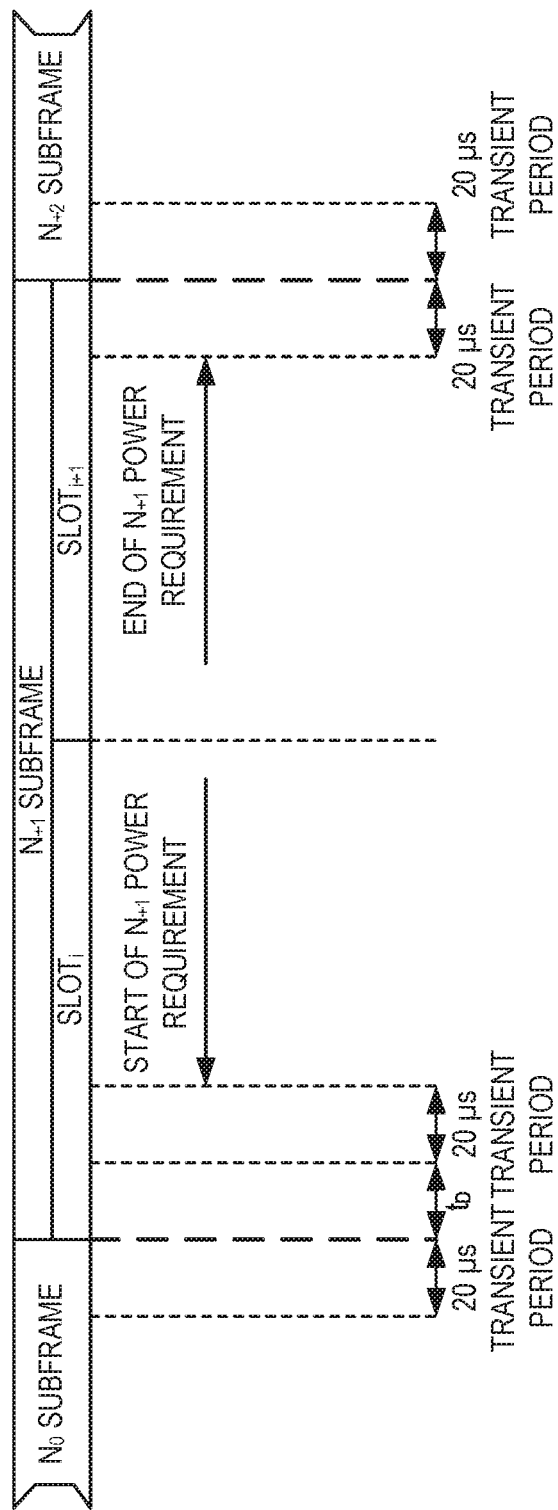
FIG. 13 illustrates a transmission power template for FS3.
Figure 14:
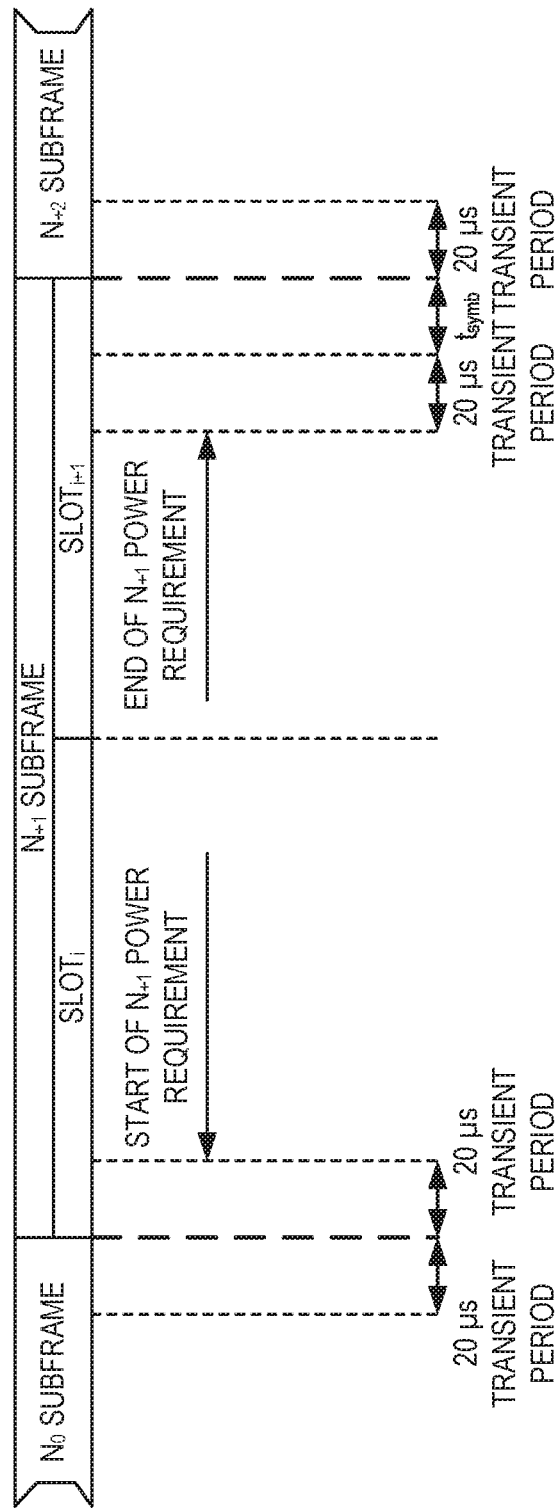
FIG. 14 illustrates a transmission power template for FS3 when the bit in the associated Downlink Control Information (DCI) has a value "1"

Slot/Subframe Boundary Time Mask:

The subframe boundary time mask defines the observation period between the previous/subsequent subframe and the (reference) subframe. A transient period at a slot boundary within a subframe is only allowed in the case of intra subframe frequency hopping. For the cases when the subframe contains SRS, the time masks in subclause 6.3.4.4 of 3GPP TS 36.101 v14.1.0 apply. FIG. 13 illustrates a transmission power template for FS3. As illustrated, for FS3, the subframe boundary time mask is as illustrated in FIG. 13 when the PUSCH starting position is modified by $t_D$. FIG. 14 illustrates a transmission power template for FS3 when the bit in the associated DCI indicating the PUSCH ending symbol has a value of "1." $T_{symb}$ denotes the duration of the last SC-FDMA symbol.

Figure 15:
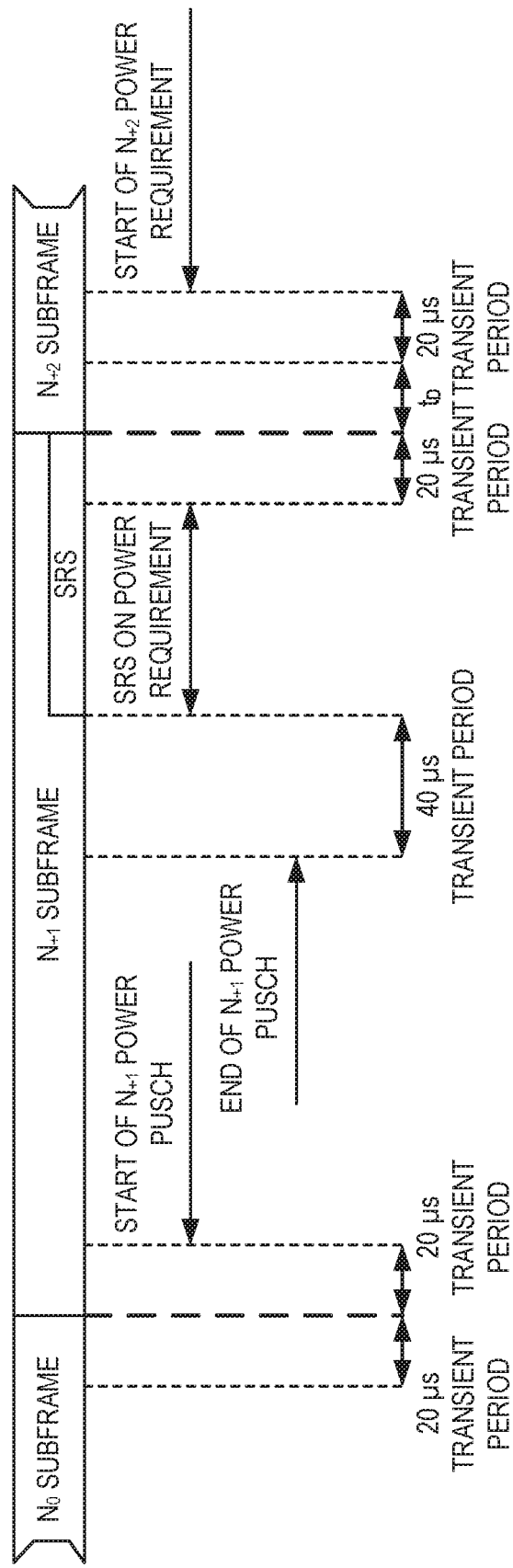
FIG. 15 illustrates a Physical Uplink Shared Channel (PUSCH)/SRS time mask for FS3 when there is a transmission before and after SRS.
Figure 16:
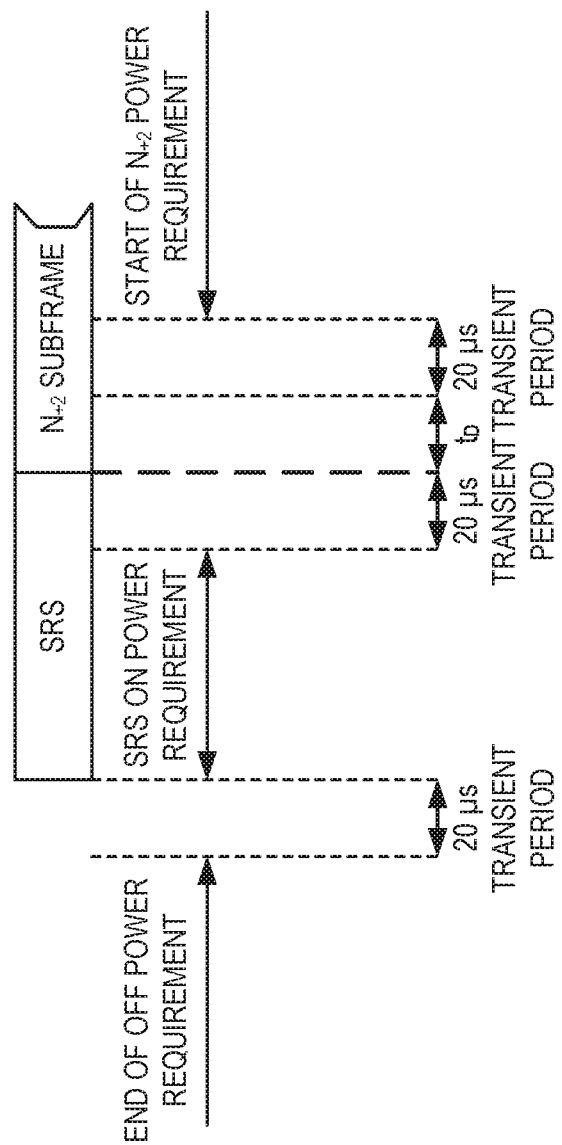
FIG. 16 illustrates a PUSCH/SRS time mask for FS3 when there is a transmission after SRS but not before.
Figure 17:
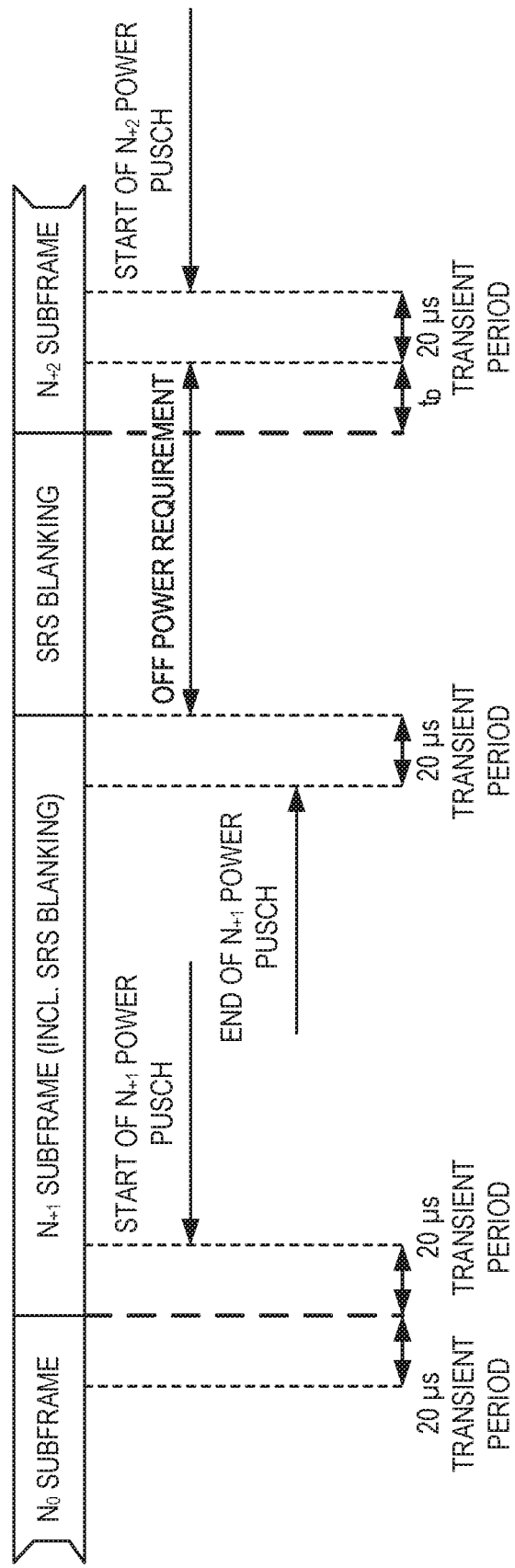
FIG. 17 illustrates a SRS time mask for FS3 when there is SRS blanking.

Physical Uplink Control Channel (PUCCH)/PUSCH/SRS Time Mask:

The PUCCH/PUSCH/SRS time mask defines the observation period between SRS and an adjacent PUSCH/PUCCH symbol and subsequent subframe. FIG. 15 illustrates a PUCCH/SRS time mask for FS3 when there is transmission before and after SRS. Here, the PUSCH starting position is modified by $t_D$. FIG. 16 illustrates a PUSCH/SRS time mask for FS3 when there is a transmission after SRS but not before. Again, the PUSCH starting position is modified by $t_D$. FIG. 17 illustrates a PUSCH/SRS time mask for FS3 when there is SRS blanking.

Example Wireless Communication Device and Radio Access Node Embodiments

Figure 18:
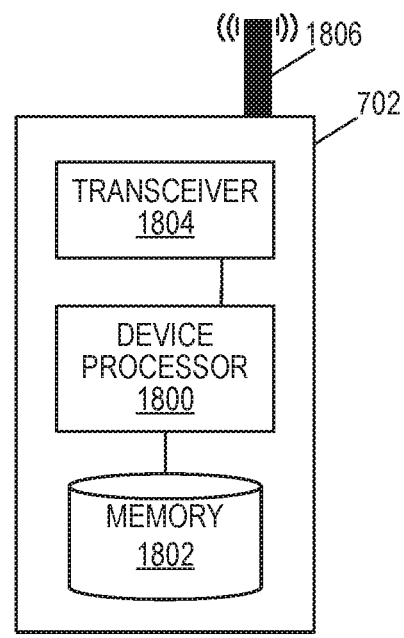
FIG. 18 illustrates a wireless communication device according to an embodiment of the disclosed subject matter.
Figure 19:
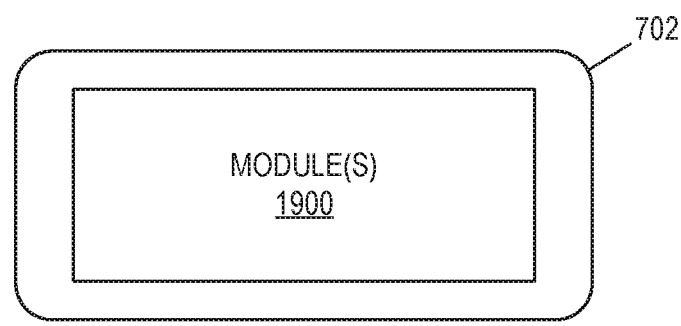
FIG. 19 illustrates a wireless communication device according to another embodiment of the disclosed subject matter.

Although wireless communication devices 702 may represent communication devices that include any suitable combination of hardware and/or software, these wireless communication devices may, in certain embodiments, represent devices such as those illustrated in greater detail by FIGS. 18 and 19. Similarly, although the illustrated radio access node may represent network nodes that include any suitable combination of hardware and/or software, these nodes may, in particular embodiments, represent devices such those illustrated in greater detail by FIGS. 20, 21, and 22.

Referring to FIG. 18, a wireless communication device 702 comprises a processor 1800 (e.g., Central Processing Units (CPUs), Application Specific Integrated Circuits (ASICs), Field Programmable Gate Arrays (FPGAs), and/or the like), a memory 1802, a transceiver 1804, and an antenna 1806. In certain embodiments, some or all of the functionality described as being provided by UEs, MTC, or M2M devices, and/or any other types of wireless communication devices may be provided by the device processor executing instructions stored on a computer-readable medium, such as the memory 1802. Alternative embodiments may include additional components beyond those shown in FIG. 18 that may be responsible for providing certain aspects of the device's functionality, including any of the functionality described herein.

Referring to FIG. 19, a wireless communication device 702 comprises at least one module 1900 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 18.

Figure 20:
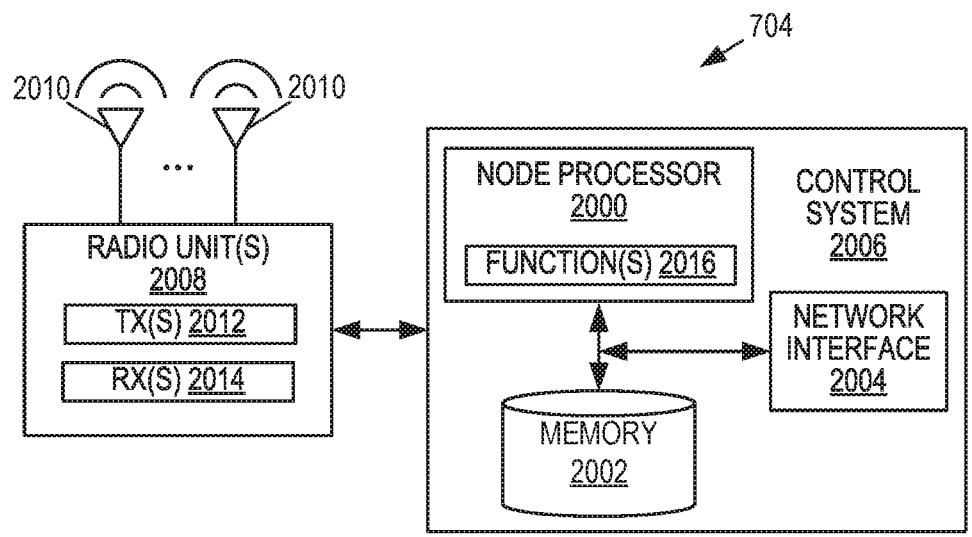
FIG. 20 illustrates a radio access node according to an embodiment of the disclosed subject matter.

Referring to FIG. 20, a radio access node 704 comprises a control system 2006 that comprises a node processor 2000 (e.g., CPUs, ASICs, FPGAs, and/or the like), memory 2002, and a network interface 2004. In addition, the radio access node 704 comprises at least one radio unit 2008 comprising at least one transmitter 2012 and at least one receiver 2014 coupled to at least one antenna 2010. In some embodiments, the radio unit 2008 is external to the control system 2006 and connected to the control system 2006 via, e.g., a wired connection (e.g., an optical cable). However, in some other embodiments, the radio unit 2008 and potentially the antenna(s) 2010 are integrated together with the control system 2006. The node processor 2000 operates to provide at least one function 2016 of the radio access node 704 as described herein. In some embodiments, the function(s) 2016 are implemented in software that is stored, e.g., in the memory 2002 and executed by the node processor 2000.

In certain embodiments, some or all of the functionality described as being provided by a base station, a node B, an eNB, and/or any other type of network node may be provided by the node processor 2000 executing instructions stored on a computer-readable medium, such as the memory 2002 shown in FIG. 20. Alternative embodiments of the radio access node 704 may comprise additional components to provide additional functionality, such as the functionality described herein and/or related supporting functionality.

Figure 21:
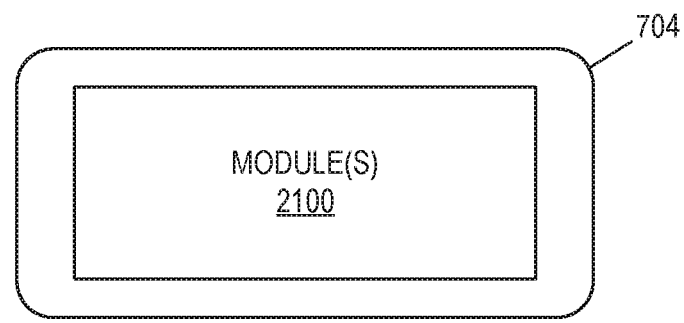
FIG. 21 illustrates a radio access node according to another embodiment of the disclosed subject matter.

Referring to FIG. 21, a radio access node 704 comprises at least one module 2100 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 20.

Figure 22:
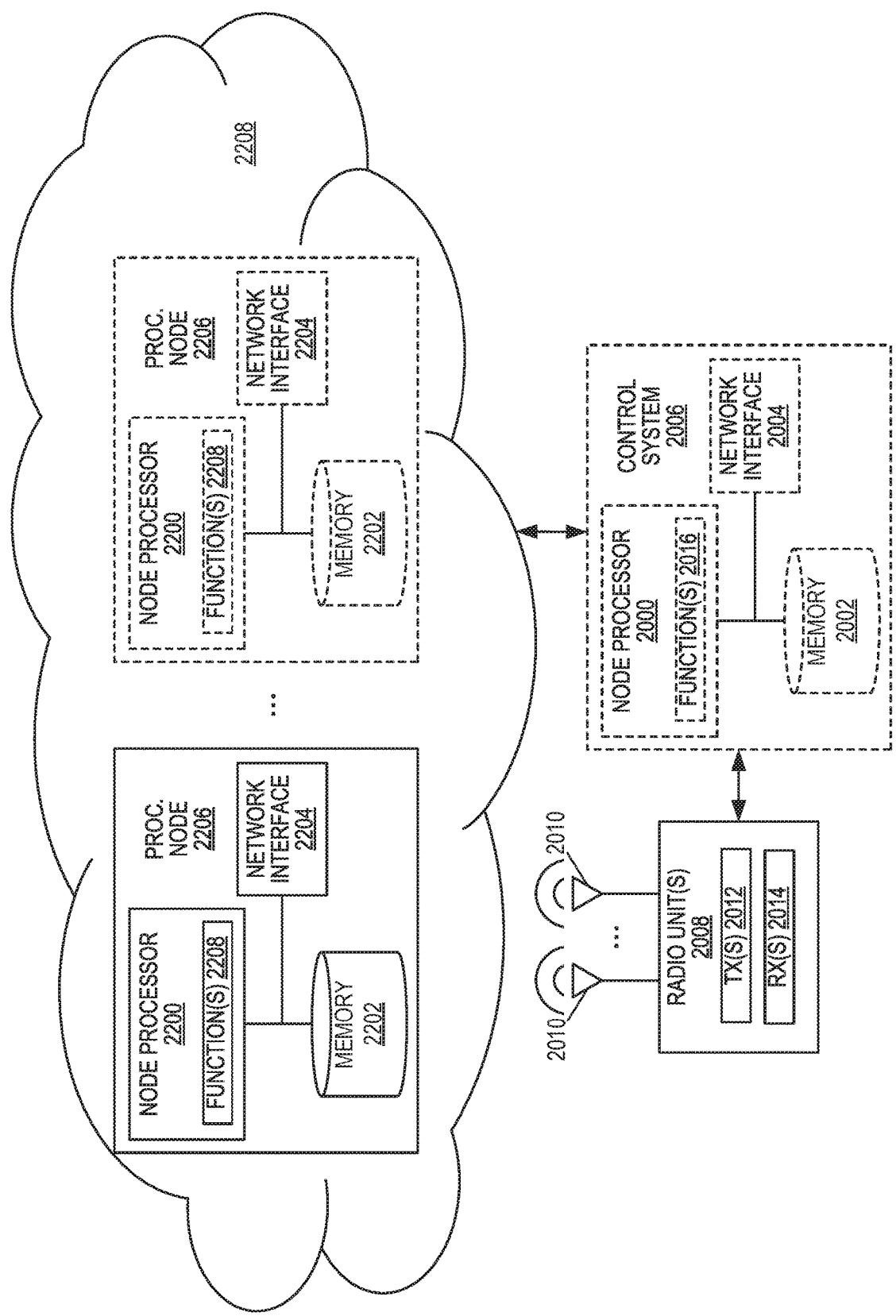
FIG. 22 illustrates a radio access node according to yet another embodiment of the disclosed subject matter.

FIG. 22 is a block diagram that illustrates a virtualized radio access node 704 according to an embodiment of the disclosed subject matter. The concepts described in relation to FIG. 22 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 22, the radio access node 704 comprises the control system 2006 as described in relation to FIG. 20. The control system 2006 is connected to one or more processing nodes 2206 coupled to or included as part of a network(s) 2208 via the network interface 2004. Each processing node 2206 comprises one or more processors 2200 (e.g., CPUs, ASICs, FPGAs, and/or the like), memory 2202, and a network interface 2204.

In this example, functions 2208 of the radio access node 704 described herein are implemented at the one or more processing nodes 2206 or distributed across the control system 2006 (as the function 2016) and the one or more processing nodes 2206 in any desired manner. In some embodiments, some or all of the functions 2208 of radio access node 704 described herein are implemented as virtual components executed by one or more virtual machines implemented in a virtual environment(s) hosted by the processing node(s) 2206. As will be appreciated by one of ordinary skill in the art, additional signaling or communication between the processing node(s) 2206 and the control system 2006 is used in order to carry out at least some of the desired functions 2208. As indicated by dotted lines, in some embodiments the control system 2006 may be omitted, in which case the radio unit(s) 2008 communicate directly with the processing node(s) 2206 via an appropriate network interface(s).

In some embodiments, a computer program comprises instructions which, when executed by at least one processor, causes at least one processor to carry out the functionality of a radio access node 704 or another node (e.g., a processing node 2206) implementing one or more of the functions of the radio access node 704 in a virtual environment according to any of the embodiments described herein.

While the disclosed subject matter has been presented above with reference to various embodiments, it will be understood that various changes in form and details may be made to the described embodiments without departing from the overall scope of the disclosed subject matter.

At least some of the following abbreviations may be used in this disclosure. If there is an inconsistency between abbreviations, preference should be given to how it is used above. If listed multiple times below, the first listing should be preferred over any subsequent listing(s).

µs Microsecond
3GPP Third Generation Partnership Project
5G Fifth Generation
ACK Acknowledgements
ASIC Application Specific Integrated Circuit
CA Carrier Aggregation
CC Component Carrier
CCA Clear Channel Assessment
CPE Customer Premises Equipment
CPU Central Processing Unit
CRS Common Reference Symbol
CSI-RS Channel State Information Reference Signal
CSI-RSRP Channel State Information Reference Signal Received Power
CSMA Carrier Sense Multiple Access
D2D Device-to-Device
DC Dual Connectivity
DCI Downlink Control Information
DRS Discovery Reference Symbol
DRX Discontinuous Reception
DTX Discontinuous Transmission
eLAA Enhanced License Assisted Access
eNB Enhanced or Evolved Node B
EVM Error Vector Magnitude
FDD Frequency Division Duplexing
FPGA Field Programmable Gate Array
FS Frame Structure
LAA License Assisted Access
LBT Listen-Before-Talk
LEE Laptop Embedded Equipment
LME Laptop Mounted Equipment
LSA Licensed Shared Access
LTE Long Term Evolution
M2M Machine-to-Machine
MBSFN Multicast-Broadcast Single Frequency Network
MC Multi-Connectivity
MCE Multi-Cell/Multicast Coordination Entity
MDT Minimization of Drive Tests
MeNB Master Enhanced or Evolved Node B
MME Mobility Management Entity
ms Millisecond
MTC Machine Type Communication
NACK Negative Acknowledgment
NB-IoT Narrowband Internet of Things
NX Next Generation
OFDM Orthogonal Frequency Division Multiplexing
PCC Primary Component Carrier
PCell Primary Cell
PMI Precoding Matrix Indicator
PRACH Physical Random Access Channel
PSC Primary Serving Cell
PSCC Primary Secondary Component Carrier
PSCell Primary Secondary Cell PSS Primary Synchronization Signal
PUCCH Physical Uplink Control Channel
PUSCH Physical Uplink Shared Channel
RAT Radio Access Technology
Rel Release
RLM Radio Link Monitoring
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SC-FDMA Single Carrier Frequency Division Multiple Access
SeNB Secondary Enhanced or Evolved Node B
SINR Signal to Interference plus Noise Ratio
SON Self-Organizing Network
SRS Sounding Reference Symbol
SSC Secondary Serving Cell
SSS Secondary Synchronization Signal
TDD Time Division Duplexing
TOA Time of Arrival
TS Technical Specification
UE User Equipment
USB Universal Serial Bus
UTRA Universal Terrestrial Radio Access
V2X Vehicle-to-X Those skilled in the art will recognize improvements and modifications to the embodiments of the present disclosure. All such improvements and modifications are considered within the scope of the concepts disclosed herein.

What is claimed is:

1. A method of operation of a node in a wireless communication system, comprising:
   providing, to a wireless device, an indication of a position of a transient period during a time mask, wherein the position of the transient period is adapted to a clear channel assessment period at the wireless device or the position of the transient period is such that the transient period occurs at least partially during a clear channel assessment period at the wireless device, and wherein the time mask defines an OFF period during which a transmitter of the wireless device is to be off, an ON period during which the transmitter of the wireless device is to be on, and the transient period wherein the transient period is a period during which the transmitter of the wireless device is to ramp-up or ramp-down.

2. The method of claim 1 wherein the transient period is a period during which the transmitter of the wireless device is to ramp-up, and providing the indication comprises providing downlink control information comprising an indication of a parameter value, wherein the position of the transient period is such that the transient period starts an amount of time defined by the parameter value after a start of a subframe.

3. The method of claim 2 further comprising:
   providing, to the wireless device, an indication of a position of a second transient period during the time mask, the second transient period being a period during which the transmitter of the wireless device is to ramp-down;
   wherein the downlink control information further comprises an indication of a second parameter value, and the position of the second transient period is such that the second transient period ends an amount of time defined by the second parameter value before an end of the subframe.

4. The method of claim 3 wherein the wireless communication system is a Third Generation Partnership Project, 3GPP, Long Term Evolution, LTE, network, and the time mask is an ON/OFF time mask for Frame Structure Type 3.

5. The method of claim 1 wherein the time mask is one of two or more time masks defined for different clear channel assessment period lengths.

6. The method of claim 1 wherein the time mask is a time mask for a signal transmitted in within a symbol period, the transient period is a period during which the transmitter of the wireless device is to ramp-down, and the transient period is inside the symbol period.

7. The method of claim 1 further comprising adapting one or more parameters of a receiver of the node to receive signals transmitted by the wireless device using the time mask.

8. A node for a wireless communication system, comprising:
   a processor; and
   memory comprising instructions executable by the processor whereby the node is operable to provide, to a wireless device via an associated radio unit, an indication of a position of a transient period during a time mask, wherein the position of the transient period is adapted to a clear channel assessment period at the wireless device or the position of the transient period is such that the transient period occurs at least partially during a clear channel assessment period at the wireless device, and wherein the time mask defines an OFF period during which a transmitter of the wireless device is to be off, an ON period during which the transmitter of the wireless device is to be on, and the transient period wherein the transient period is a period during which the transmitter of the wireless device is to ramp-up or ramp-down.

9. The node of claim 8 wherein the transient period is a period during which the transmitter of the wireless device is to ramp-up, and wherein providing the indication comprises providing downlink control information comprising an indication of a parameter value, wherein the position of the transient period is such that the transient period starts an amount of time defined by the parameter value after a start of a subframe.

10. The node of claim 9, wherein, by execution of the instructions by the processor, the node is further operable to:
    provide, to the wireless device, an indication of a position of a second transient period during the time mask, the second transient period being a period during which the transmitter of the wireless device is to ramp-down;
    wherein the downlink control information further comprises an indication of a second parameter value, and the position of the second transient period is such that the second transient period ends an amount of time defined by the second parameter value before an end of the subframe.

11. The node of claim 10 wherein the wireless communication system is a Third Generation Partnership Project, 3GPP, Long Term Evolution, LTE, network, and the time mask is an ON/OFF time mask for Frame Structure Type 3.

12. The node of claim 8 wherein the time mask is one of two or more time masks defined for different clear channel assessment period lengths.

13. The node of claim 8 wherein the time mask is a time mask for a signal transmitted in within a symbol period, the transient period is a period during which the transmitter of the wireless device is to ramp-down, and the transient period is inside the symbol period.

14. The node of claim 8 further comprising adapting one or more parameters of a receiver of the node to receive signals transmitted by the wireless device using the time mask.

15. A method of operation of a wireless device in a wireless communication system, comprising:
 determining a position of a transient period during a time mask, wherein the position of the transient period is adapted to a clear channel assessment period at the wireless device or the position of the transient period is such that the transient period occurs at least partially during a clear channel assessment period at the wireless device, and wherein the time mask defines an OFF period during which a transmitter of the wireless device is to be off, an ON period during which the transmitter of the wireless device is to be on, and the transient period wherein the transient period is a period during which the transmitter of the wireless device is to ramp-up or ramp-down; and
 transmitting a signal in accordance with the time mask and the determined position of the transient period during the time mask.

16. The method of claim 15 wherein determining the position of the transient period comprises determining the position of the transient period based on an indication received from a network node and/or predefined information.

17. The method of claim 15 wherein the transient period is a period during which the transmitter of the wireless device is to ramp-up, and receiving the indication comprises receiving downlink control information comprising an indication of a parameter value, wherein the position of the transient period is such that the transient period starts an amount of time defined by the parameter value after a start of a subframe.

18. The method of claim 17 further comprising:
 receiving, from the node of the wireless communication system, an indication of a position of a second transient period during the time mask, the second transient period being a period during which the transmitter of the wireless device is to ramp-down;
 wherein the downlink control information further comprises an indication of a second parameter value, and the position of the second transient period is such that the second transient period ends an amount of time defined by the second parameter value before an end of the subframe.

19. The method of claim 18 wherein the wireless communication system is a Third Generation Partnership Project, 3GPP, Long Term Evolution, LTE, network, and the time mask is an ON/OFF time mask for Frame Structure Type 3.

20. The method of claim 15 wherein the time mask is one of two or more time masks defined for different clear channel assessment period lengths.

21. The method of claim 15 wherein the time mask is a time mask for a signal transmitted in within a symbol period, the transient period is a period during which the transmitter of the wireless device is to ramp-down, and the transient period is inside the symbol period.

22. A wireless device for a wireless communication system, the wireless device being adapted to:
 determine a position of a transient period during a time mask, wherein the position of the transient period is adapted to a clear channel assessment period at the wireless device or the position of the transient period is such that the transient period occurs at least partially during a clear channel assessment period at the wireless device, and wherein the time mask defines an OFF period during which a transmitter of the wireless device is to be off, an ON period during which the transmitter of the wireless device is to be on, and the transient period wherein the transient period is a period during which the transmitter of the wireless device is to ramp-up or ramp-down; and
 transmit a signal in accordance with the time mask and the indication of the position of the transient period during the time mask.

23. The wireless device of claim 22 wherein determining the position of the transient period comprises determining the position of the transient period based on an indication received from a network node and/or predefined information.

24. The wireless device of claim 22 wherein the transient period is a period during which the transmitter of the wireless device is to ramp-up, and receiving the indication comprises receiving downlink control information comprising an indication of a parameter value, wherein the position of the transient period is such that the transient period starts an amount of time defined by the parameter value after a start of a subframe.

25. The wireless device of claim 24 where, by execution of the instructions by the processor, the wireless device is further operable to:
 receive, from the node of the wireless communication system, an indication of a position of a second transient period during the time mask, the second transient period being a period during which the transmitter of the wireless device is to ramp-down;
 wherein the downlink control information further comprises an indication of a second parameter value, and the position of the second transient period is such that the second transient period ends an amount of time defined by the second parameter value before an end of the subframe.

26. The wireless device of claim 25 wherein the wireless communication system is a Third Generation Partnership Project, 3GPP, Long Term Evolution, LTE, network, and the time mask is an ON/OFF time mask for Frame Structure Type 3.

27. The wireless device of claim 22 wherein the time mask is one of two or more time masks defined for different clear channel assessment period lengths.

28. The wireless device of claim 22 wherein the time mask is a time mask for a signal transmitted in within a symbol period, the transient period is a period during which the transmitter of the wireless device is to ramp-down, and the transient period is inside the symbol period.

* * * * *

UNITED STATES PATENT AND TRADEMARK OFFICE
CERTIFICATE OF CORRECTION

PATENT NO.        : 10,687,361 B2
APPLICATION NO.   : 16/337908
DATED             : June 16, 2020
INVENTOR(S)       : Bergljung et al.

It is certified that error appears in the above-identified patent and that said Letters Patent is hereby corrected as shown below:

In the Specification

In Column 2, Lines 3-4, delete "Discovery Reference Symbols" and insert -- Discovery Reference Signals --, therefor.

In Column 2, Lines 4-5, delete "Common Reference Symbols" and insert -- Common Reference Signals --, therefor.

In Column 3, Line 59, delete "Sounding Reference Symbol" and insert -- Sounding Reference Signal --, therefor.

In Column 8, Lines 44-45, delete "Sounding Reference Symbol" and insert -- Sounding Reference Signal --, therefor.

In Column 11, Line 1, delete "Discovery Reference Symbol" and insert -- Discovery Reference Signal --, therefor.

In Column 11, Line 2, delete "comprise of any type of" and insert -- comprise any type of --, therefor.

In Column 11, Lines 4-5, delete "Common Reference Symbol" and insert -- Common Reference Signal --, therefor.

In Columns 11 & 12, Lines 67 & 1, delete "Sounding Reference Symbol" and insert -- Sounding Reference Signal --, therefor.

In Column 18, Line 25, delete "Common Reference Symbol" and insert -- Common Reference Signal --, therefor.

In Column 18, Line 33, delete "Discovery Reference Symbol" and insert -- Discovery Reference Signal --, therefor.

Signed and Sealed this
Third Day of June, 2025

Coke Morgan Stewart
*Acting Director of the United States Patent and Trademark Office*

In Column 19, Line 23, delete "Sounding Reference Symbol" and insert -- Sounding Reference Signal --, therefor.